US012581345B2

(12) United States Patent
Hu

(10) Patent No.: US 12,581,345 B2
(45) Date of Patent: Mar. 17, 2026

(54) COMMUNICATION METHOD AND APPARATUS, USER EQUIPMENT, NETWORK DEVICE, AND STORAGE MEDIUM

(71) Applicant: Beijing Xiaomi Mobile Software Co., Ltd., Beijing (CN)

(72) Inventor: Ziquan Hu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 284 days.

(21) Appl. No.: 18/271,291

(22) PCT Filed: Jan. 8, 2021

(86) PCT No.: PCT/CN2021/070892
§ 371 (c)(1),
(2) Date: Jul. 7, 2023

(87) PCT Pub. No.: WO2022/147772
PCT Pub. Date: Jul. 14, 2022

(65) Prior Publication Data
US 2024/0073729 A1     Feb. 29, 2024

(51) Int. Cl.
*H04W 24/10* (2009.01)
*H04W 24/08* (2009.01)
(52) U.S. Cl.
CPC ........... *H04W 24/10* (2013.01); *H04W 24/08* (2013.01)
(58) Field of Classification Search
CPC .............................. H04W 24/08; H04W 24/10
See application file for complete search history.

(56) References Cited

U.S. PATENT DOCUMENTS

| | | | |
|---|---|---|---|
| 2022/0338124 A1* | 10/2022 | Sabouri-Sichani ... | H04W 24/08 |
| 2022/0353722 A1* | 11/2022 | Koskela ................ | H04W 24/10 |
| 2023/0089930 A1* | 3/2023 | Li ...................... | H04W 52/0229 |
| | | | 370/329 |

FOREIGN PATENT DOCUMENTS

| | | |
|---|---|---|
| CN | 107438263 A | 12/2017 |
| CN | 111278028 A | 6/2020 |
| CN | 111294853 A | 6/2020 |
| CN | 111641962 A | 9/2020 |
| CN | 111757346 A | 10/2020 |
| CN | 111800800 A | 10/2020 |
| EP | 1611843 A1 | 1/2006 |
| WO | 2013133630 A1 | 9/2013 |
| WO | 2019215901 A1 | 11/2019 |
| WO | 2020067855 A1 | 4/2020 |
| WO | 2020089513 A1 | 5/2020 |
| WO | 2020/144404 A1 | 7/2020 |

OTHER PUBLICATIONS

Intel Corporation,"Relaxation of measurements", 3GPP TSG RAN WG2 Meeting#108, R2-1914847, Reno, NV, USA, Nov. 18-22, 2019.

* cited by examiner

*Primary Examiner* — Muhammad N Edun
(74) *Attorney, Agent, or Firm* — Volpe Koenig

(57) ABSTRACT
A communication method includes: detecting whether a reference signal satisfies a measurement relaxation condition; and performing measurement relaxation on measurement of the reference signal in response to determining that the reference signal satisfies the measurement relaxation condition.

16 Claims, 5 Drawing Sheets

| Detect whether a reference signal satisfies a measurement relaxation condition | 201 |

| Perform measurement relaxation on measurement of the reference signal in response to determining that the reference signal satisfies the measurement relaxation condition | 202 |

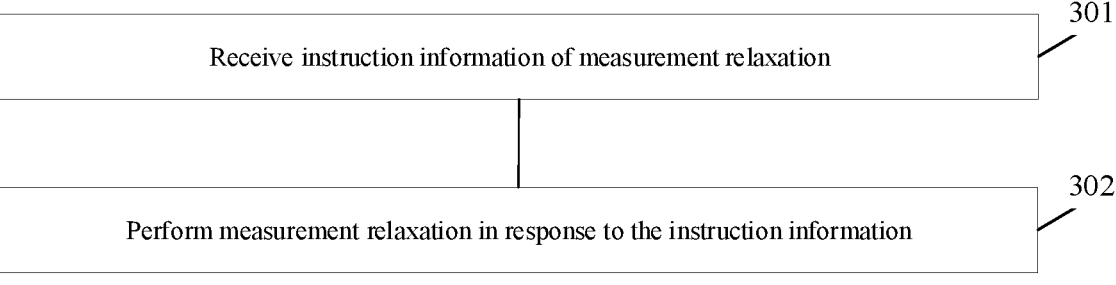
Fig. 3
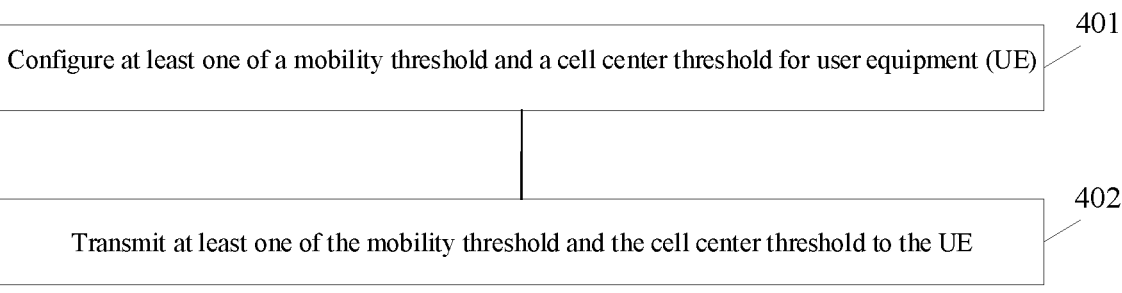
Fig. 4
| 501 |
| Transmit instruction information of measurement relaxation |
Fig. 5

Communication apparatus 900

Transmission unit 90

COMMUNICATION METHOD AND APPARATUS, USER EQUIPMENT, NETWORK DEVICE, AND STORAGE MEDIUM

CROSS REFERENCE TO RELATED APPLICATION

The present application is a U.S. National Stage of International Application No. PCT/CN2021/070892, filed on PCT Jan. 8, 2021, the contents of all of which are incorporated herein by reference in their entirety for all purposes.

BACKGROUND

In a current 5th generation mobile communication (5G) new radio (NR) system, radio link monitoring (RLM) is defined to guarantee the communication quality of the downlink of a service cell. In order to keep a transmission performance free from the influence of beam occlusion, beam failure detection (BFD) is defined to enable the network side to quickly resume transmission from a beam failure.

SUMMARY

In view of this, examples of the disclosure provide a communication method and apparatus, user equipment, a network device, and a storage medium.

According to a first aspect of the disclosure, a communication method is provided and is performed by user equipment (UE). The method includes: detecting whether a reference signal satisfies a measurement relaxation condition; and performing measurement relaxation on the measurement of the reference signal in response to determining that the reference signal satisfies the measurement relaxation condition.

According to a second aspect of the disclosure, a communication method is provided and is performed by the UE. The method includes: receiving instruction information of measurement relaxation; and performing measurement relaxation in response to the instruction information.

According to a third aspect of the disclosure, a communication method is provided, and is performed by a network device. The method includes: configuring at least one of a mobility threshold and a cell center threshold for the UE, and transmitting at least one of the mobility threshold and the cell center threshold to the UE.

According to a fourth aspect of the disclosure, user equipment is provided. The user equipment includes: a processor, a transceiver, a memory, and an executable program stored in the memory and runnable by the processor, where the processor executes steps of the communication method in the first aspect or the second aspect when running the executable program.

According to a fifth aspect of the disclosure, a network device is provided. The network device includes: a processor, a transceiver, a memory, and an executable program stored in the memory and runnable by the processor, where the processor executes steps of the communication method in the third aspect or the fourth aspect when running the executable program.

According to a sixth aspect of the disclosure, a non-transitory computer-readable storage medium is provided and stores an executable program, where the executable program implements steps of the communication method in the first aspect, the second aspect, the third aspect or the fourth aspect when executed by a processor.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

FIG. 3 is a schematic flowchart of a communication method according to an example.

FIG. 4 is a schematic flowchart of a communication method according to an example.

FIG. 5 is a schematic flowchart of a communication method according to an example.

DETAILED DESCRIPTION

Figures 1, 2:
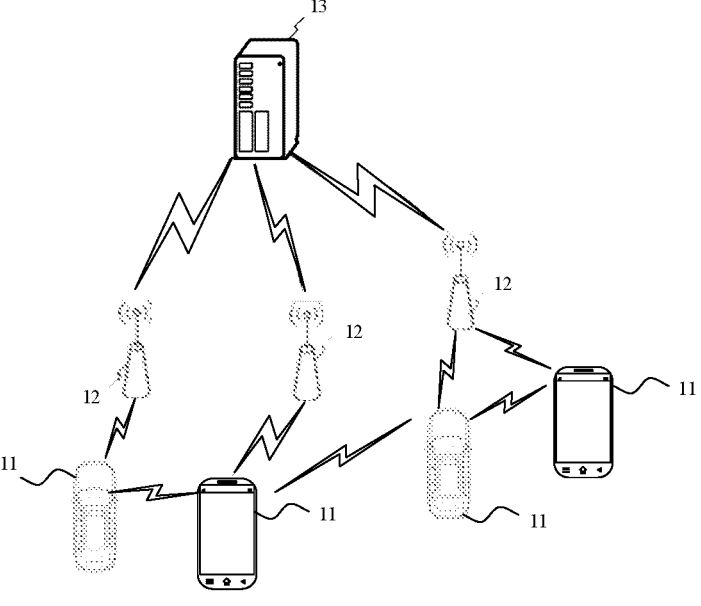
FIG. 1 is a schematic structural diagram of a radio communication system according to an example.
FIG. 2 is a schematic flowchart of a communication method according to an example.

Examples will be described in detail here, and their instances are shown in accompanying drawings. When the following description involves the accompanying drawings, the same numerals in different accompanying drawings represent the same or similar elements unless otherwise indicated. Embodiments described in the following examples do not represent all embodiments consistent with examples of the disclosure. On the contrary, these embodiments are merely instances of apparatuses and methods consistent with some aspects of the examples of the disclosure as detailed in the appended claims.

Terms used in the examples of the disclosure are merely used for describing specific examples rather than limiting the examples of the disclosure. As used in the examples and the appended claims of the disclosure, the singular forms such as "a", "the" and "this" are also intended to include plural forms, unless otherwise clearly stated in the context. It should also be understood that the term "and/or" used here refers to and includes any or all possible combinations of one or more associated listed items.

It should be understood that although terms such as first, second and third can be used in the examples of the disclosure to describe different types of information, the information should not be limited to these terms. These terms are merely used to distinguish the same type of information from each other. For example, first information can be referred to as second information, and similarly, second information can be referred to as first information, without departing from the scope of the examples of the disclosure. Depending on the context, the word "if" as used here can be interpreted as "at the time of" or "when" or "in response to determining".

User equipment (UE) periodically measures a radio link monitoring reference signal (RLM-RS), and a measurement result is a signal to interference plus noise ratio (SINR) value of the reference signal. By comparing a block error ratio (BLER) value corresponding to the SINR value with an in-synchronization threshold and an out-of-synchronization threshold, an in-synchronization (IS)/out-of-synchronization (OOS) state of the UE is determined, and the physical layer informs the radio resource control (RRC) layer of a determined IS/OOS state.

In addition, the UE can further periodically measure a beam failure detection reference signal (BFD-RS) of a current service beam, and the measurement result is an SINR value of the reference signal. By comparing a BLER value corresponding to the SINR value with a threshold, the service beam quality is determined, and the physical layer reports the result to the medium access control (MAC) layer.

While the mechanism improves the communication quality, it leads to a significant increase in power consumption and a shorter battery life of the UE, and greatly impacts user experience and deployment of related services accordingly.

The disclosure relates to a communication method and apparatus, user equipment (UE), a network device, and a storage medium.

With reference to FIG. 1, a schematic structural diagram of a radio communication system according to an example of the disclosure is shown. As shown in FIG. 1, the radio communication system is a communication system based on cellular mobile communication technology. The radio communication system may include several terminals 11 and several base stations 12.

The terminal 11 may be a device that provides voice and/or data connectivity for a user. The terminal 11 may communicate with one or more core networks via a radio access network (RAN). The terminal 11 may be an Internet of Things terminal, such as a sensor device, a mobile phone (or a "cellular" phone) and a computer with an Internet of Things terminal. For instance, the terminal may be a fixed, portable, pocket-type, handheld, computer built-in or vehicle-mounted apparatus. For example, the terminal may be a station (STA), a subscriber unit, a subscriber station, a mobile station, a mobile, a remote station, an access point, a remote terminal, an access terminal, a user terminal, a user agent, a user device or user equipment (UE). Alternatively, the terminal 11 may also be a device of an unmanned aerial vehicle. Alternatively, the terminal 11 may be a vehicle-mounted device, for example, an electronic control unit having a radio communication function, or a radio communication device externally connected with an electronic control unit. Alternatively, the terminal 11 may also be a roadside device, such as a street lamp, a signal lamp or other roadside devices having a radio communication function.

The base station 12 may be a network-side device in a radio communication system. The radio communication system may be a 4th generation mobile communication (4G) system, also referred to as a long term evolution (LTE) system, or the radio communication system may be a 5G system, also referred to as a new radio (NR) system or a 5G NR system. Alternatively, the radio communication system may be any generation system. An access network in the 5G system may be referred to as a new generation radio access network (NG-RAN) or a machine-type communication (MTC) system.

The base station 12 may be an evolved base station (eNB) used in the 4G system. Alternatively, the base station 12 may be a base station (gNB) having a centralized distributed architecture in the 5G system. When in the centralized distributed architecture, the base station 12 usually includes a central unit (CU) and at least two distributed units (DU). Protocol stacks of a packet data convergence protocol (PDCP) layer, a radio link control (RLC) layer and a media access control (MAC) layer are arranged in the central unit. A physical (PHY) layer protocol stack is arranged in the distributed unit. A specific implementation mode of the base station 12 is not limited to the example of the disclosure.

A radio connection may be established between the base station 12 and the terminal 11 through a radio link. In different embodiments, the radio is a radio based on the fourth generation mobile communication network technology (4G) standard, or the radio is a radio based on the fifth generation mobile communication network technology (5G) standard, for example, the radio is new, or the radio may also be a radio based on the next generation mobile communication network technology standard after 5G.

In some examples, an end to end (E2E) connection may also be established between the terminals 11, for example, vehicle to vehicle (V2V) communication, vehicle to infrastructure (V2I) communication and vehicle to pedestrian (V2P) communication in vehicle to everything (V2X).

In some examples, the radio communication system above may further include a network management device 13. Several base stations 12 are separately connected to the network management device 13. The network management device 13 may be a core network device in the radio communication system, for example, the network management device 13 may be a mobility management entity (MME) in an evolved packet core network (EPC). Alternatively, the network management device may be other core network devices, such as a serving gateway (SGW), a public data network gateway (PGW), a policy and charging rules function (PCRF), or a home subscriber server (HSS). An implementation form of the network management device 13 is not limited to the example of the disclosure.

An execution subject involved in the example of the disclosure includes, but is not limited to, a user equipment (UE) in a cellular mobile communication system, a base station for cellular mobile communication, etc.

FIG. 2 is a schematic flowchart of a communication method according to an example. As shown in FIG. 2, the communication method of the example of the disclosure is performed by UE, and the communication method includes steps 201 and 202.

Step 201 includes: whether a reference signal satisfies a measurement relaxation condition is detected.

In the example of the disclosure, the measurement relaxation condition includes: the UE moves at a low speed, or the UE is located in a cell center, or the UE moves at a low speed and is located in a cell center. The low-speed movement means that the communication reference signal satisfies a certain communication quality index. As an embodiment, it is determined whether the UE moves at a low speed through a measured communication quality parameter of the reference signal.

The reference signal includes at least one of the following: a radio link monitoring reference signal (RLM-RS) and a beam failure detection reference signal (BFD-RS). As an example, the RLM-RS includes a synchronization signal and physical broadcast channel (PBCH) block (SSB) and a channel state information reference signal (CSI-RS). The BFD-RS includes at least one of the SSB and the CSI-RS.

In the example of the disclosure, the step that whether a reference signal satisfies a measurement relaxation condition is detected includes: first parameters of the reference signal are detected in a measurement evaluation time window, an average of the first parameters in the measurement evaluation time window is computed, and a difference between a preset reference value and the average of the first parameters is computed; it is determined that the measurement relaxation condition is satisfied in response to determining that the difference is less than a preset mobility threshold; or, it is determined that the measurement relaxation condition is not satisfied in response to determining that the difference is greater than or equal to a mobility threshold.

Here, the first parameter includes the signal-to-interference-plus-noise ratio (SINR). As an embodiment, the first parameter may also be a reception power of the signal, etc. In the example of the disclosure, the UE determines whether the measurement relaxation condition is satisfied by detecting the reference signal.

In the example of the disclosure, the preset reference value is set as the average of the first parameters in response to cell handover, or in response to determining that the average of the first parameters is greater than the preset reference value, or in response to determining that the measurement relaxation condition is not satisfied in a set time window. The set time window here may be a time window for determining whether the difference is less than the preset mobility threshold.

In the example of the disclosure, the corresponding preset reference value is also set for the first parameter, the difference between the preset reference value and the average of the first parameters in the measurement evaluation time window is computed, and based on a relation between the difference and the preset mobility threshold, it is determined whether the UE is in a low-speed movement state, so as to determine whether to perform measurement relaxation and start a measurement relaxation mode.

As another embodiment, the step that whether a reference signal satisfies a measurement relaxation condition is detected further includes: first parameters of the reference signal are detected in a measurement evaluation time window, and an average of the first parameters in the measurement evaluation time window is computed; and it is determined that the measurement relaxation condition is satisfied in response to determining that the average of the first parameters is greater than a cell center threshold; or, it is determined that the measurement relaxation condition is not satisfied in response to determining that the average of the first parameters is less than or equal to a cell center threshold.

Here, the first parameter includes a SINR, a signal reception power, etc. By setting the cell center threshold, it is determined whether the UE is located in the cell center according to a magnitude relation between the average of the first parameters in the measurement evaluation time window and the cell center threshold, so as to determine whether the UE satisfies the measurement relaxation condition, and if so, the UE starts the measurement relaxation mode, so that a measurement frequency of the UE is reduced for the reference signal and power is saved accordingly.

In the example of the disclosure, in a scene of low-speed movement or the cell center, when the reference signal is the BFD-RS, measurement relaxation is performed on the measurement of reference signals in all service cells in response to determining that the reference signals in all the service cells supporting carrier aggregation or dual connectivity satisfy the measurement relaxation condition. When the reference signal is the BFD-RS, no measurement relaxation is performed on the measurement of reference signals in all service cells in response to determining that a reference signal in at least one service cell supporting carrier aggregation or dual connectivity does not satisfy the measurement relaxation condition. That is to say, when the reference signal is the BFD-RS, under the condition that the UE supports carrier aggregation or dual connectivity, it is required that all service cells corresponding to a carrier wave supported by the UE satisfy the measurement relaxation condition, and the measurement relaxation is performed on the measurement of reference signals in all service cells. Otherwise, as long as there is a service cell corresponding to the carrier supported by UE that does not satisfy the measurement relaxation condition, no measurement relaxation is performed on measurement of the reference signals in all the service cells corresponding to the carrier wave.

In the example of the disclosure, the measurement frequency of the UE for the reference signal may also be made lower when the UE is in the low-speed movement state and in the cell center.

In the example of the disclosure, as an embodiment, the step that whether a reference signal satisfies a measurement relaxation condition is detected further includes: first parameters of the reference signal are detected in a measurement evaluation time window, an average of the first parameters in the measurement evaluation time window is computed, and a difference between a preset reference value and the average of the first parameters is computed; it is determined that the measurement relaxation condition is satisfied in response to determining that the difference is less than a preset mobility threshold, and the average of the first parameters is greater than a preset cell center threshold; or, it is determined that the measurement relaxation condition is not satisfied in response to determining that the difference is greater than or equal to a mobility threshold, or the average of the first parameters is less than or equal to a preset cell center threshold.

In the case that the UE is in a low-speed movement state and in the cell center, if the first parameter is greater than the set threshold, no detection of the reference signal is performed. That is to say, when the UE is in a low-speed movement state and in the cell center, if a channel quality condition of the reference signal is desirable, it is unnecessary to detect the reference signal, that is, to suspend the detection of the reference signal. In this case, if the reference signal is the BFD-RS, measurement relaxation is performed on measurement of reference signals in all service cells in response to determining that a reference signal in at least one service cell supporting carrier aggregation or dual connectivity satisfies the measurement relaxation condition; and no measurement relaxation is performed on measurement of reference signals in all service cells in response to determining that the reference signals in all the service cells supporting carrier aggregation or dual connectivity do not satisfy the measurement relaxation condition.

Then, in step 202: measurement relaxation is performed on measurement of the reference signal in response to determining that the reference signal satisfies the measurement relaxation condition.

In the example of the disclosure, the step of measurement relaxation is performed on the measurement of the reference signal, including: at least one of a measurement evaluation period and an instruction period of the reference signal is adjusted. The step that at least one of the measurement evaluation period and the instruction period of the reference signal is adjusted means extending at least one of the measurement evaluation period and the instruction period.

In the example of the disclosure, it is needed to guarantee that the instruction period is longer than the measurement evaluation period in response to determining that the instruction period of the reference signal is adjusted.

FIG. 3 is a schematic flowchart of a communication method according to an example. As shown in FIG. 3, the communication method of the example of the disclosure is performed by the UE, and the communication method includes steps 301 and 302.

In Step 301, instruction information on measurement relaxation is received.

Then in Step 302 measurement relaxation is performed in response to the instruction information.

In the example of the disclosure, the instruction information includes measurement window duration and a measurement window period. That is to say, the network device transmits an instruction of measurement relaxation to the UE, such that the UE may measure the reference signal in the measurement window duration, and the UE may enter dormancy during non-measurement window duration. When the measurement window period comes, the UE starts the measurement relaxation based on the reference signal. In the example of the disclosure, the measurement window period is K times as long as the measurement window duration, where K≥2.

The measurement relaxation is performed according to measurement window duration within a measurement window period in response to determining that UE is not configured with a discontinuous reception (DRX) mode.

The measurement relaxation is performed according to measurement window duration within a measurement window period during DRX on duration in response to determining that UE is configured with DRX.

In the example of the disclosure, the measurement relaxation includes at least one of the following: RLM and BFD. When the measurement relaxation of the UE is BFD measurement relaxation, and the UE supports carrier aggregation or dual connectivity, for all service cells of carrier aggregation or dual connection, the measurement relaxation is performed according to the measurement window duration within the measurement window period.

FIG. 4 is a schematic flowchart of a communication method according to an example. As shown in FIG. 4, the communication method of the example of the disclosure is performed by a network device, and the communication method includes steps 401 and 402.

In Step 401 at least one of a mobility threshold and a cell center threshold is configured for the UE.

Then, in Step 402 the at least one of the mobility threshold and the cell center threshold is transmitted to the UE.

In the example of the disclosure, on the basis of the processing steps above, the communication method of the example of the disclosure further includes: a measurement relaxation condition is configured for the UE, and the measurement relaxation condition is transmitted to the UE.

In this example, the network device configures the measurement relaxation condition for the UE, such that the UE performs measurement relaxation based on the measurement relaxation condition, and determines whether to perform measurement relaxation.

FIG. 5 is a schematic flowchart of a communication method according to an example. As shown in FIG. 5, the communication method of the example of the disclosure is performed by a network device, and the communication method includes step 501.

In Step 501, the instruction information for measurement relaxation is transmitted.

The instruction information is configured to instruct the UE to perform measurement relaxation.

The instruction information includes the measurement window duration and a measurement window period. The measurement window period is K times as long as the measurement window duration, where K≥2.

In the example of the disclosure, the network device transmits the instruction information of measurement relaxation to the UE, such that the UE performs RLM and BFD measurement behavior based on the instruction information.

The RLM measurement behavior and the BFD measurement behavior in the example of the disclosure may be performed separately, and the UE may perform the RLM measurement or the BFD measurement alone, or perform the RLM measurement or the BFD measurement in parallel.

The essence of a technical solution of the example of the disclosure is further explained based on specific examples.

In the example of the disclosure, when the UE satisfies a certain condition, the RLM and BFD measurement behavior can be relaxed, thus saving power.

In the example of the disclosure, whether RLM and BFD may be relaxed may be determined by two mechanisms, specifically, three conditions that may be relaxed are defined for the UE, and are applicable to the RLM and the BFD, a corresponding configured reference signal quality is used to determine the measurement relaxation condition separately, and the RLM and the BFD are independently configured with a threshold and a relaxation coefficient of at least one of a measurement evaluation period and an instruction period.

In the example of the disclosure, a technical solution for the RLM includes a processing mode as follows.

An RLM measurement relaxation evaluation time window $T_{RLM}$ is defined, and the sampling number of the RLM-RS in $T_{RLM}$ is N.

Condition 1: the UE moves at a low speed.

A network configures a low mobility threshold SINR_low_RLM, the UE compares $\Delta$SINR(i) with SINR_low_RLM, and if $\Delta$SINR(i)<SINR_low_RLM is satisfied within time $T_{delta\_RLM}$, the UE is deemed to be in a low-speed movement state.

$$\Delta SINR(i) = REF_{RLM} - \frac{1}{N}\sum_{n=i-N}^{i} SINR(n)$$

$REF_{RLM}$ is a reference value of RLM-RS SINR, which may be a preset value, such as an empirical value.

If the UE has cell handover, or $$\left(\frac{1}{N}\sum_{n=i-N}^{i} SINR(n) - REF_{RLM}\right) > 0,$$

or the condition is not satisfied within time $T_{delta\_RLM}$, $REF_{RLM}$ is updated to be a current measurement value $$\frac{1}{N}\sum_{n=i-N}^{i} SINR(n)$$

of the UE.

Condition 2: UE locates in a cell center.

A network configures a cell center threshold SINR_center_RLM, the UE compares SINR(i) with SINR_center_RLM, and if SINR(i)>SINR_center_RLM is satisfied, the UE is deemed to be in the cell center position.

where $$SINR(i) = \frac{1}{N} \sum_{n=i-N}^{i} SINR(n).$$

Condition 3: the UE is located in a cell center and moves at a low speed, that is, the UE satisfies both condition 1 and condition 2.

The UE evaluates its own signal quality according to a measurement result of the reference signal, and determines whether the measurement relaxation condition is satisfied. If condition 1 is satisfied, the UE may perform measurement relaxation on the RLM, and the relaxation method includes: a) the evaluation period is extended by a coefficient A; and b) the instruction period is extended by a coefficient C, if the instruction period is extended, the instruction period needs to be longer than a general evaluation period.

If condition 2 is satisfied, the UE may perform measurement relaxation on the RLM, and the relaxation method includes: a) the evaluation period is extended by a coefficient E, in particular, coefficient E may be the same as the coefficient A for measurement relaxation performed in the case that the condition 1 is satisfied; and b) the instruction period is extended by a coefficient F, so as to make the instruction period longer than the general evaluation period, in particular, coefficient F may be the same as the coefficient C for measurement relaxation performed in the case that the condition 1 is satisfied.

If condition 3 is satisfied, the UE may perform measurement relaxation on the RLM, and the relaxation method includes: a) if the RLM-RS signal quality is greater than a threshold Z, no RLM measurement is performed, where Z>SINR_center_RLM; b) the evaluation period is extended by a coefficient B, where B>A and B>E; and c) the instruction period is extended by a coefficient D, and if the instruction period is extended, the instruction period is made longer than the evaluation period, where D>C and D>F.

In the example of the disclosure, a technical solution for the BFD includes a processing mode as follows: the network defines a BFD measurement relaxation evaluation time window $T_{BFD}$, and the sampling number of the BFD-RS in $T_{BFD}$ is M.

Condition 11: the UE moves at a low speed.

The network configures a low mobility threshold SINR_low_BFD, the UE compares $\Delta$SINR(i) with SINR_low_BFD, and if $\Delta$SINR(i)<SINR_low_BFD is satisfied within a time window $T_{delta\_BFD}$, the UE is deemed to be in a low-speed movement state.

where $$\Delta SINR(i) = REF_{BFD} - \frac{1}{M} \sum_{n=i-M}^{i} SINR(m).$$

$REF_{BFD}$ is a reference value of BFD-RS SINR, which may be a preset value, such as an empirical value.

If cell handover occurs, or $$\left( \frac{1}{N} \sum_{m=i-N}^{i} SINR(m) - REF_{BFD} \right) > 0,$$

or the measurement relaxation condition is not satisfied within time $T_{delta\_BFD}$, $REF_{BFD}$ is updated to be a current measurement value $$\frac{1}{M} \sum_{m=i-M}^{i} SINR(m)$$

of the UE.

Condition 12: UE locates in a cell center.

The network configures a cell center threshold SINR_center_BFD, the UE compares SINR(i) with SINR_center_BFD, and if SINR(i)>SINR_center_BFD is satisfied, the UE is deemed to be in the cell center position.

where $$SINR(i) = \frac{1}{M} \sum_{m=i-M}^{i} SINR(m).$$

Condition 13: the UE is located in a cell center and moves at a low speed, that is, the UE satisfies both condition 11 and condition 12.

The UE evaluates its own signal quality according to a measurement result of the reference signal, and determines whether the measurement relaxation condition is satisfied. If condition 11 is satisfied, the UE may perform measurement relaxation on the BFD, and the relaxation method includes: a) the evaluation period is extended by a coefficient a; b) the instruction period is extended by a coefficient c, if the instruction period is extended, the instruction period is needed to be longer than a general evaluation period; and c) in particular, since the UE supports carrier aggregation or dual connectivity, and a secondary cell (SCell) further supports the BFD, and for carrier aggregation or dual connectivity in an intra-band mode, the UE usually uses the same radio frequency (RF) front end for a primary secondary cell (SpCell) and SCell. In this case, if all service cells satisfy the relaxation condition 11, the measurement relaxation is performed. If one service cell does not satisfy the condition 11, no measurement relaxation is performed on all involved service cells.

If the condition 12 is satisfied, the UE may perform measurement relaxation on the BFD, and the relaxation method includes: a) the evaluation period is extended by a coefficient e, in particular, coefficient e may be the same as the coefficient a for measurement relaxation performed in the case that the condition 11 is satisfied; b) the instruction period is extended by a coefficient f, so as to make the instruction period longer than the general evaluation period, in particular, coefficient f may be the same as the coefficient c for measurement relaxation performed in the case that the condition 11 is satisfied; and c) in particular, for intra-band CA/DC, if all service cells satisfy the relaxation condition 12, the measurement relaxation is performed. If one service cell does not satisfy the condition 12, no measurement relaxation is performed on all involved service cells.

If the condition 13 is satisfied, the UE may perform measurement relaxation on the BFD, and the relaxation method includes: a) if the BFD-RS signal quality is greater than a threshold z, no RLM measurement is performed, where z>SINR_center_BFD; b) the evaluation period is extended by a coefficient b, where b>a and b>e; c) the instruction period is extended by a coefficient d, and if the instruction period is extended, the instruction period is made longer than the evaluation period, where d>c and d>f; and d) in particular, for intra-band CA/DC, if there is one service cell satisfying the relaxation condition 13, the measurement relaxation is performed on all involved service cells.

In the example of the disclosure, the network device instructs the UE to perform measurement relaxation behavior by transmitting RLM or BFD relaxation signaling, and a relaxation signaling configuration includes a measurement window duration parameter $T_{relax\_on}$ and a measurement window period parameter relaxation periodicity, where the UE may enter a dormancy state before or after $T_{relax\_on}$. The RLM and the BFD may use different periodic configurations. $T_{relax\_on}=T_{evaluation}$ is satisfied, where $T_{evaluation}$ represents the measurement evaluation period; and relaxation periodicity>K×$T_{evaluation}$, where K≥2.

1) If the network is not configured with the DRX, the UE performs measurement relaxation according to relaxation signaling transmitted by network device.

2) If the network device is configured with the DRX, the UE performs measurement during DRX on duration when the measurement relaxation indicate $T_{relax\_on}$.

3) In particular, in the case of intra-band CA/DC supported by the BFD, the UE performs unified measurement relaxation according to an instruction of the network device.

The example of the disclosure provides two modes to determine whether the UE enters a power saving state mechanism and the corresponding RLM and BFD relaxation measurement behaviors. When the UE enters the power saving state, the measurement relaxation on RLM and BFD can be performed, thus achieving a power saving effect.

Figure 6:
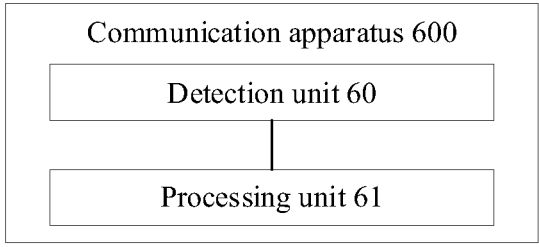
FIG. 6 is a schematic structural diagram of the composition of a communication apparatus according to an example.

FIG. 6 is a schematic structural diagram of composition of a communication apparatus 600 according to an example. As shown in FIG. 6, the communication apparatus 600 of the example of the disclosure is performed by UE, and the communication apparatus 600 includes a detection unit 60 and a processing unit 61.

The detection unit 60 is configured to detect whether a reference signal satisfies a measurement relaxation condition.

The processing unit 61 is configured to perform measurement relaxation on measurement of the reference signal in response to determining that the reference signal satisfies the measurement relaxation condition.

In some examples, the measurement relaxation condition includes: the UE moves at a low speed, or the UE is located in a cell center, or the UE moves at a low speed and is located in a cell center.

In some examples, the detection unit 60 is further configured to: detect first parameters of the reference signal in a measurement evaluation time window, and compute an average of the first parameters in the measurement evaluation time window; compute a difference between a preset reference value and the average of the first parameters; and determine that the measurement relaxation condition is satisfied in response to determining that the difference is less than a preset mobility threshold; or, determine that the measurement relaxation condition is not satisfied in response to determining that the difference is greater than or equal to a mobility threshold.

In some examples, the detection unit 60 is further configured to: detect first parameters of the reference signal in a measurement evaluation time window, and compute an average of the first parameters in the measurement evaluation time window; and determine that the measurement relaxation condition is satisfied in response to determining that the average of the first parameters is greater than a cell center threshold; or, determine that the measurement relaxation condition is not satisfied in response to determining that the average of the first parameters is less than or equal to a cell center threshold.

In some examples, in a scene of low-speed movement or the cell center, measurement of the reference signal is BFD; and the processing unit 61 is further configured to: perform measurement relaxation on measurement of reference signals in all service cells in response to determining that the reference signals in all the service cells supporting carrier aggregation or dual connectivity satisfy the measurement relaxation condition; and perform no measurement relaxation on measurement of reference signals in all service cells in response to determining that a reference signal in at least one service cell supporting carrier aggregation or dual connectivity does not satisfy the measurement relaxation condition.

In some examples, the detection unit 60 is further configured to: detect first parameters of the reference signal in a measurement evaluation time window, and compute an average of the first parameters in the measurement evaluation time window; compute a difference between a preset reference value and the average of the first parameters; and determine that the measurement relaxation condition is satisfied in response to determining that the difference is less than a preset mobility threshold, and the average of the first parameters is greater than a preset cell center threshold; or, determine that the measurement relaxation condition is not satisfied in response to determining that the difference is greater than or equal to a mobility threshold, or the average of the first parameters is less than or equal to a preset cell center threshold.

In some examples, the detection unit 60 is further configured to: perform no detection of the reference signal in response to determining that the reference signal satisfies the measurement relaxation condition, and the first parameter is greater than a set threshold.

In some examples, in a scene of low-speed movement and in the cell center, measurement of the reference signal is BFD; and the processing unit 61 is further configured to: perform measurement relaxation on measurement of reference signals in all service cells in response to determining that a reference signal in at least one service cell supporting carrier aggregation or dual connectivity satisfies the measurement relaxation condition; and perform no measurement relaxation on measurement of reference signals in all service cells in response to determining that the reference signals in all the service cells supporting carrier aggregation or dual connectivity do not satisfy the measurement relaxation condition.

In some examples, the apparatus 600 further includes: a setting unit (not shown in FIG. 6) configured to set the preset reference value as the average of the first parameters in response to cell handover, or in response to determining that the average of the first parameters is greater than the preset reference value, or in response to determining that the measurement relaxation condition is not satisfied in a set time window.

In some examples, the processing unit 61 is further configured to: adjust at least one of a measurement evaluation period and an instruction period of the reference signal.

In some examples, the processing unit 61 is further configured to: extend at least one of the measurement evaluation period and the instruction period.

In some examples, the detection unit 60 is further configured to detect that the instruction period is longer than the measurement evaluation period in response to determining that the instruction period of the reference signal is adjusted.

In some examples, the reference signal includes at least one of the following: an RLM-RS and a BFD-RS.

In an example, the detection unit 60, the processing unit 61, the setting unit, etc. may be implemented by one or more central processing units (CPU), graphics processing units (GPU), baseband processors (BP), application specific integrated circuits (ASIC), digital signal processors (DSP), programmable logic devices (PLD), complex programmable logic devices (CPLD), field-programmable gate arrays (FPGA), general-purpose processors, controllers, micro controller units (MCU), microprocessors, or other electronic elements, or be implemented by combining one or more radio frequency (RF) antennae, so as to execute steps of the communication method of the foregoing example.

In the example of the disclosure, specific modes in which the units of the communication apparatus 600 shown in FIG. 6 execute operations have been described in detail in the examples relating to the method, and will not be described in detail here.

Figure 7:
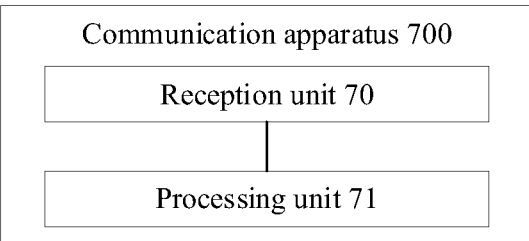
FIG. 7 is a schematic structural diagram of the composition of a communication apparatus according to an example.

FIG. 7 is another schematic structural diagram of composition of a communication apparatus 700 according to an example. As shown in FIG. 7, the communication apparatus 700 of the example of the disclosure is performed by UE, and the communication apparatus 700 includes a reception unit 70 and a processing unit 71.

The reception unit 70 is configured to receive instruction information of measurement relaxation.

The processing unit 71 is configured to perform measurement relaxation in response to the instruction information.

In some examples, the instruction information includes measurement window duration and a measurement window period.

In some examples, the processing unit 71 is further configured to: perform the measurement relaxation according to measurement window duration within a measurement window period in response to determining that discontinuous reception (DRX) is not configured; or, perform the measurement relaxation according to measurement window duration within a measurement window period during DRX on duration in response to determining that DRX is configured.

In some examples, the measurement relaxation includes at least one of the following: radio link monitoring (RLM) and beam failure detection (BFD).

In some examples, the processing unit 71 is further configured to: perform the measurement relaxation on a service cell supporting carrier aggregation or dual connectivity according to the measurement window duration within a measurement window period in response to determining that the measurement relaxation is BFD measurement relaxation.

In an example, the reception unit 70, the processing unit 71, etc. may be implemented by one or more central processing units (CPU), graphics processing units (GPU), baseband processors (BP), application specific integrated circuits (ASIC), digital signal processors (DSP), programmable logic devices (PLD), complex programmable logic devices (CPLD), field-programmable gate arrays (FPGA), general-purpose processors, controllers, micro controller units (MCU), microprocessors, or other electronic elements, or be implemented by combining one or more radio frequency (RF) antennae, so as to execute steps of the communication method of the foregoing example.

In the example of the disclosure, specific modes in which the units of the communication apparatus 700 shown in FIG.

7 execute operations have been described in detail in the examples relating to the method, and will not be described in detail here.

Figures 8, 9:
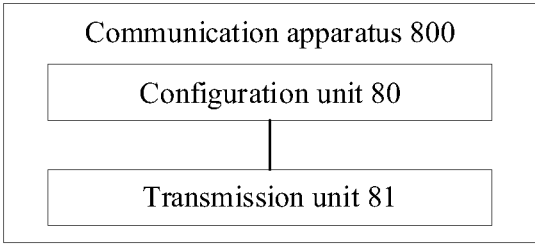
FIG. 8 is a schematic structural diagram of the composition of a communication apparatus according to an example.
FIG. 9 is a schematic structural diagram of the composition of a communication apparatus according to an example.

FIG. 8 is yet another schematic structural diagram of composition of a communication apparatus 800 according to an example. As shown in FIG. 8, the communication apparatus 800 of the example of the disclosure is performed by a network device, and the communication apparatus 800 includes a configuration unit 80 and a transmission unit 81.

The configuration unit 80 is configured to configure at least one of a mobility threshold and a cell center threshold for UE.

The transmission unit 81 is configured to transmit at least one of the mobility threshold and the cell center threshold to the UE.

In some examples, the configuration unit 80 is further configured to: configure a measurement relaxation condition for the UE, and transmit the measurement relaxation condition to the UE.

In an example, the configuration unit 80, the transmission unit 81, etc. may be implemented by one or more central processing units (CPU), graphics processing units (GPU), baseband processors (BP), application specific integrated circuits (ASIC), digital signal processors (DSP), programmable logic devices (PLD), complex programmable logic devices (CPLD), field-programmable gate arrays (FPGA), general-purpose processors, controllers, micro controller units (MCU), microprocessors, or other electronic elements, or be implemented by combining one or more radio frequency (RF) antennae, so as to execute steps of the communication method of the foregoing example.

In the example of the disclosure, specific modes in which the units of the communication apparatus 800 shown in FIG. 8 execute operations have been described in detail in the examples relating to the method, and will not be described in detail here.

FIG. 9 is still another schematic structural diagram of composition of a communication apparatus 900 according to an example. As shown in FIG. 9, the communication apparatus 900 of the example of the disclosure is performed by a network device, and the communication apparatus 900 includes a transmission unit 90.

The transmission unit 90 is configured to transmit instruction information of measurement relaxation, where the instruction information is configured to instruct UE to perform measurement relaxation.

In some examples, the instruction information includes measurement window duration and a measurement window period.

In some examples, the measurement window period is K times as long as the measurement window duration, where $K \geq 2$.

In an example, the transmission unit 90, etc. may be implemented by one or more central processing units (CPU), graphics processing units (GPU), baseband processors (BP), application specific integrated circuits (ASIC), digital signal processors (DSP), programmable logic devices (PLD), complex programmable logic devices (CPLD), field-programmable gate arrays (FPGA), general-purpose processors, controllers, micro controller units (MCU), microprocessors, or other electronic elements, or be implemented by combining one or more radio frequency (RF) antennae, so as to execute steps of the communication method of the foregoing example.

In the example of the disclosure, specific modes in which the units of the communication apparatus 900 shown in FIG.

9 execute operations have been described in detail in the examples relating to the method, and will not be described in detail here.

Figure 10:
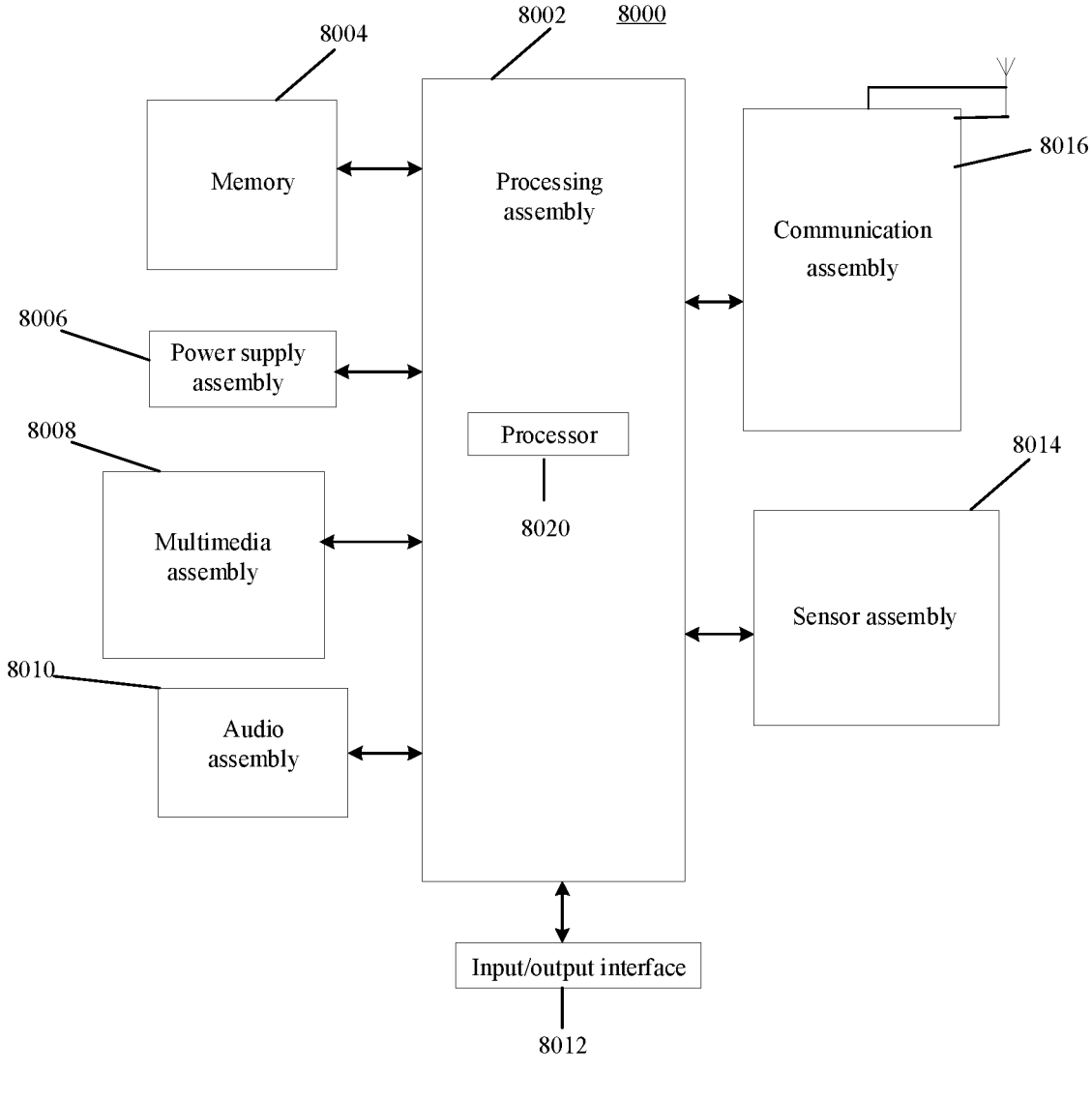
FIG. 10 is a schematic structural diagram of the composition of user equipment according to an example.

FIG. 10 is a block diagram of user equipment 8000 according to an example. For example, the user equipment 8000 may be a mobile phone, a computer, a digital broadcast terminal, a message transceiving device, a game console, a tablet device, a medical device, a fitness device, a personal digital assistant, etc.

With reference to FIG. 10, the user equipment 8000 may include one or more of a processing assembly 8002, a memory 8004, a power supply assembly 8006, a multimedia assembly 8008, an audio assembly 8010, an input/output (I/O) interface 8012, a sensor assembly 8014, and a communication assembly 8016.

Generally, the processing assembly 8002 controls an overall operation of the user equipment 8000, such as an operation associated with display, a telephone call, data communication, a camera operation, and a recording operation. The processing assembly 8002 may include one or more processors 8020 to execute an instruction, so as to complete all or some of the steps of the above method. In addition, the processing assembly 8002 may include one or more modules to facilitate interaction between the processing assembly 8002 and other assemblies. For example, the processing assembly 8002 may include a multimedia module to facilitate interaction between the multimedia assembly 8008 and the processing assembly 8002.

The memory 8004 is configured to store various types of data to support the operation of the equipment 8000. Instances of these data include instructions, contact data, phonebook data, messages, pictures, video, etc. of any application or method operated on the user equipment 8000. The memory 8004 may be implemented by any type of volatile or non-volatile storage devices or their combinations, such as static random access memory (SRAM), an electrically erasable programmable read-only memory (EE-PROM), a programming read-only memory (EPROM), a programmable read-only memory (PROM), a read-only memory (ROM), a magnetic memory, a flash memory, a magnetic disk or an optical disk.

The power supply assembly 8006 energizes various assemblies of the user equipment 8000. The power supply assembly 8006 may include a power management system, one or more power supplies, and other assemblies associated with power generation, management, and distribution for the user equipment 8000.

The multimedia assembly 8008 includes a screen providing an output interface between the user equipment 8000 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touching, swiping, and gestures on the TP. The touch sensors may not merely sense a boundary of a touch or swipe action, but also detect time of duration and a pressure associated with the touch or swipe action. In some examples, the multimedia assembly 8008 includes a front-facing camera and/or a rear-facing camera. When the equipment 8000 is in an operational mode, for example, a photographing mode or a video mode, the front-facing camera and/or the rear-facing camera may receive external multimedia data. Each of the front-facing and rear-facing cameras may be a fixed optical lens system or have a focal length and an optical zoom capacity.

The audio assembly 8010 is configured to output and/or input an audio signal. For example, the audio assembly 8010 includes a microphone (MIC). The microphone is configured to receive an external audio signal when the user equipment 8000 is in an operation mode such as a call mode, a recording mode or a speech identification mode. The received audio signal may be further stored in the memory 8004 or transmitted via the communication assembly 8016. In some examples, the audio assembly 8010 may further include a speaker for outputting audio signals.

The I/O interface 8012 provides an interface between the processing assembly 8002 and a peripheral interface module that may be a keyboard, a click wheel, a button, etc. These buttons may include, but are not limited to, a home button, a volume button, a start button, and a lock button.

The sensor assembly 8014 includes one or more sensors for providing state assessments in various aspects for the user equipment 8000. For example, the sensor assembly 8014 may detect an on/off state of the equipment 8000, and the relative positioning of assemblies. For example, the assemblies are a display and a keypad of the user equipment 8000. The sensor assembly 8014 may also detect a change in position of the user equipment 8000 or an assembly of the user equipment 8000, presence or absence of contact between the user and the user equipment 8000, orientation or acceleration/deceleration of the user equipment 8000, and temperature change of the user equipment 8000. The sensor assembly 8014 may include a proximity sensor configured to detect presence of a nearby object without any physical contact. The sensor assembly 8014 may further include an optical sensor, such as a complementary metal-oxide-semiconductor transistor (CMOS) or charge-coupled device (CCD) image sensor, for use in imaging applications. In some examples, the sensor assembly 8014 may further include an acceleration sensor, a gyroscope sensor, a magnetic sensor, a pressure sensor, or a temperature sensor.

The communication assembly 8016 is configured to facilitate wired or wireless communication between the user equipment 8000 and other devices. The user equipment 8000 may access a wireless network based on a communication standard, such as WiFi, 2G or 3G, or their combination. In an example, the communication assembly 8016 receives a broadcast signal or broadcast related information from an external broadcast management system via a broadcast channel. In an example, the communication assembly 8016 further includes a near field communication (NFC) module to promote short-range communications. For example, the NFC module may be implemented based on a radio frequency identification (RFID) technology, an infrared data association (IrDA) technology, an ultra-wide band (UWB) technology, a Bluetooth (BT) technology, etc.

In an example, the user equipment 8000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, so as to execute steps of the communication method above.

In an example, a non-transitory computer-readable storage medium including an instruction is further provided, for example, a memory 8004 including an instruction, and the instruction above may be executed by the processor 8020 of the user equipment 8000, so as to implement steps of the communication method above. For example, the non-transitory computer-readable storage medium may be a read only memory (ROM), a random access memory (RAM), a CD-ROM, a magnetic tape, a floppy disc, an optical data storage device, etc.

The example of the disclosure further describes a network device. The network device includes a processor, a transceiver, a memory, and an executable program stored in the memory and runnable by the processor, where the processor executes steps of the communication method of the foregoing example when running the executable program.

The example of the disclosure further describes the user equipment. The user equipment includes a processor, a transceiver, a memory, and an executable program stored in the memory and runnable by the processor, where the processor executes steps of the communication method of the foregoing example when running the executable program.

The example of the disclosure further describes a storage medium. The storage medium stores an executable program, where the executable program implements the steps of the communication method of the foregoing example when executed by a processor.

Those skilled in the art could easily conceive of other implementation solutions of the examples of the disclosure upon consideration of the description and implementation of the invention disclosed here. The disclosure is intended to cover any variation, use or adaptive change of the example of the disclosure, which follows the general principles of the example of the disclosure and includes common general knowledge or conventional technical means in the technical field not disclosed in example of the disclosure. The description and the example are merely considered illustrative, and a true scope and spirit of the example of the disclosure are indicated by the following claims.

It should be understood that the examples of the disclosure are not limited to precise structures described above and shown in the accompanying drawings, and various modifications and changes can be made without departing from the scope of the disclosure. The scope of the example of the disclosure is merely limited by the appended claims.

According to a first aspect of the disclosure, a communication method is provided and is performed by user equipment (UE). The method includes: detecting whether a reference signal satisfies a measurement relaxation condition; and performing measurement relaxation on the measurement of the reference signal in response to determining that the reference signal satisfies the measurement relaxation condition.

In some examples, the measurement relaxation condition includes: the UE moves at a low speed, or the UE is located in a cell center, or the UE moves at a low speed and is located in a cell center.

In some examples, the detecting whether a reference signal satisfies a measurement relaxation condition includes: detecting first parameters of the reference signal in a measurement evaluation time window, and computing an average of the first parameters in the measurement evaluation time window; computing a difference between a preset reference value and the average of the first parameters; and determining that the measurement relaxation condition is satisfied in response to determining that the difference is less than a preset mobility threshold; or, determining that the measurement relaxation condition is not satisfied in response to determining that the difference is greater than or equal to a mobility threshold.

In some examples, the detecting whether a reference signal satisfies a measurement relaxation condition includes: detecting first parameters of the reference signal in a measurement evaluation time window, and computing an average of the first parameters in the measurement evaluation time window; and determining that the measurement relaxation condition is satisfied in response to determining that the average of the first parameters is greater than a cell center threshold; or, determining that the measurement relaxation condition is not satisfied in response to determining that the average of the first parameters is less than or equal to a cell center threshold.

In some examples, measurement of the reference signal is BFD; performing measurement relaxation on measurement of reference signals in all service cells in response to determining that the reference signals in all the service cells supporting carrier aggregation or dual connectivity satisfy the measurement relaxation condition; and performing no measurement relaxation on measurement of reference signals in all service cells in response to determining that a reference signal in at least one service cell supporting carrier aggregation or dual connectivity does not satisfy the measurement relaxation condition.

In some examples, the detecting whether a reference signal satisfies a measurement relaxation condition includes: detecting first parameters of the reference signal in a measurement evaluation time window, and computing an average of the first parameters in the measurement evaluation time window; computing a difference between a preset reference value and the average of the first parameters; and determining that the measurement relaxation condition is satisfied in response to determining that the difference is less than a preset mobility threshold, and the average of the first parameters is greater than a preset cell center threshold; or, determining that the measurement relaxation condition is not satisfied in response to determining that the difference is greater than or equal to a mobility threshold, or the average of the first parameters is less than or equal to a preset cell center threshold.

In some examples, the method further includes: performing no detection of the reference signal in response to determining that the reference signal satisfies the measurement relaxation condition, and the first parameter is greater than a set threshold.

In some examples, measurement of the reference signal is BFD; performing measurement relaxation on measurement of reference signals in all service cells in response to determining that a reference signal in at least one service cell supporting carrier aggregation or dual connectivity satisfies the measurement relaxation condition; and performing no measurement relaxation on measurement of reference signals in all service cells in response to determining that the reference signals in all the service cells supporting carrier aggregation or dual connectivity do not satisfy the measurement relaxation condition.

In some examples, the method further includes: setting the preset reference value as the average of the first parameters in response to cell handover, or in response to determining that the average of the first parameters is greater than the preset reference value, or in response to determining that the measurement relaxation condition is not satisfied in a set time window.

In some examples, the performing measurement relaxation on measurement of the reference signal includes: adjusting at least one of a measurement evaluation period and an instruction period of the reference signal.

In some examples, adjusting at least one of the measurement evaluation period and the instruction period of the reference signal includes extending at least one of the measurement evaluation period and the instruction period.

In some examples, the instruction period is longer than the measurement evaluation period in response to determining that the instruction period of the reference signal is adjusted.

In some examples, the reference signal includes at least one of the following: a radio link monitoring reference signal (RLM-RS) and a beam failure detection reference signal (BFD-RS).

According to a second aspect of the disclosure, a communication method is provided and is performed by the UE. The method includes: receiving instruction information of measurement relaxation; and performing measurement relaxation in response to the instruction information.

In some examples, the instruction information includes the measurement window duration and a measurement window period.

In some examples, the method further includes: performing the measurement relaxation according to measurement window duration within a measurement window period in response to determining that discontinuous reception (DRX) is not configured; or, performing the measurement relaxation according to measurement window duration within a measurement window period during DRX on duration in response to determining that DRX is configured.

In some examples, the measurement relaxation includes at least one of the following: radio link monitoring (RLM) and beam failure detection (BFD).

In some examples, the measurement relaxation is performed on a service cell supporting carrier aggregation or dual connectivity according to the measurement window duration within a measurement window period in response to determining that the measurement relaxation is BFD measurement relaxation.

According to a third aspect of the disclosure, a communication method is provided, and is performed by a network device. The method includes: configuring at least one of a mobility threshold and a cell center threshold for the UE, and transmitting the at least one of the mobility threshold and the cell center threshold to the UE.

In some examples, the method further includes: configuring a measurement relaxation condition for the UE, and transmitting the measurement relaxation condition to the UE.

According to a fourth aspect of the disclosure, a communication method is provided, and is performed by a network device. The method includes: transmitting instruction information of measurement relaxation, where the instruction information is configured to instruct the UE to perform measurement relaxation.

In some examples, the instruction information includes the measurement window duration and a measurement window period.

In some examples, the measurement window period is K times as long as the measurement window duration, where K≥2.

According to a fifth aspect of the disclosure, a communication apparatus is provided, and is performed by the UE. The apparatus includes: a detection unit configured to detect whether a reference signal satisfies a measurement relaxation condition; and a processing unit configured to perform measurement relaxation on measurement of the reference signal in response to determining that the reference signal satisfies the measurement relaxation condition.

In some examples, the measurement relaxation condition includes: the UE moves at a low speed, or the UE is located in a cell center, or the UE moves at a low speed and is located in a cell center.

In some examples, the detection unit is further configured to: detect first parameters of the reference signal in a measurement evaluation time window, and compute an average of the first parameters in the measurement evaluation time window; compute a difference between a preset reference value and the average of the first parameters; and determine that the measurement relaxation condition is satisfied in response to determining that the difference is less than a preset mobility threshold; or, determine that the measurement relaxation condition is not satisfied in response to determining that the difference is greater than or equal to a mobility threshold.

In some examples, the detection unit is further configured to: detect first parameters of the reference signal in a measurement evaluation time window, and compute an average of the first parameters in the measurement evaluation time window; and determine that the measurement relaxation condition is satisfied in response to determining that the average of the first parameters is greater than a cell center threshold; or, determine that the measurement relaxation condition is not satisfied in response to determining that the average of the first parameters is less than or equal to a cell center threshold.

In some examples, measurement of the reference signal is BFD; and the processing unit is further configured to: perform measurement relaxation on measurement of reference signals in all service cells in response to determining that the reference signals in all the service cells supporting carrier aggregation or dual connectivity satisfy the measurement relaxation condition; and no measurement relaxation is performed on reference signals in all service cells in response to determining that a reference signal in at least one service cell supporting carrier aggregation or dual connectivity does not satisfy the measurement relaxation condition.

In some examples, the detection unit is further configured to: detect first parameters of the reference signal in a measurement evaluation time window, and compute an average of the first parameters in the measurement evaluation time window; compute a difference between a preset reference value and the average of the first parameters; and determine that the measurement relaxation condition is satisfied in response to determining that the difference is less than a preset mobility threshold, and the average of the first parameters is greater than a preset cell center threshold; or, determine that the measurement relaxation condition is not satisfied in response to determining that the difference is greater than or equal to a mobility threshold, or the average of the first parameters is less than or equal to a preset cell center threshold.

In some examples, the detection unit is further configured to: perform no detection of the reference signal in response to determining that the reference signal satisfies the measurement relaxation condition, and the first parameter is greater than a set threshold.

In some examples, measurement of the reference signal is BFD; and the processing unit is further configured to: perform measurement relaxation on measurement of reference signals in all service cells in response to determining that a reference signal in at least one service cell supporting carrier aggregation or dual connectivity satisfies the measurement relaxation condition; and perform no measurement relaxation on measurement of reference signals in all service cells in response to determining that the reference signals in all the service cells supporting carrier aggregation or dual connectivity do not satisfy the measurement relaxation condition.

In some examples, the apparatus further includes: a setting unit configured to set the preset reference value as the average of the first parameters in response to cell handover, or in response to determining that the average of the first parameters is greater than the preset reference value, or in response to determining that the measurement relaxation condition is not satisfied in a set time window.

In some examples, the processing unit is further configured to: adjust at least one of a measurement evaluation period and an instruction period of the reference signal.

In some examples, the processing unit is further configured to: extend at least one of the measurement evaluation period and the instruction period.

In some examples, the detection unit is further configured to detect that the instruction period is longer than the measurement evaluation period in response to determining that the instruction period of the reference signal is adjusted.

In some examples, the reference signal includes at least one of the following: a radio link monitoring reference signal (RLM-RS) and a beam failure detection reference signal (BFD-RS).

According to a sixth aspect of the disclosure, a communication apparatus is provided, and is performed by UE. The apparatus includes: a reception unit configured to receive instruction information of measurement relaxation; and a processing unit configured to perform measurement relaxation in response to the instruction information.

In some examples, the instruction information includes the measurement window duration and a measurement window period.

In some examples, the processing unit is further configured to: perform the measurement relaxation according to measurement window duration within a measurement window period in response to determining that discontinuous reception (DRX) is not configured; or, perform the measurement relaxation according to measurement window duration within a measurement window period during DRX on duration in response to determining that DRX is configured.

In some examples, the measurement relaxation includes at least one of the following: radio link monitoring (RLM) and beam failure detection (BFD).

In some examples, the processing unit is further configured to: perform the measurement relaxation on a service cell supporting carrier aggregation or dual connectivity according to the measurement window duration within a measurement window period in response to determining that the measurement relaxation is BFD measurement relaxation.

According to a seventh aspect of the disclosure, a communication apparatus is provided, and is performed by a network device. The apparatus includes: a configuration unit configured to configure at least one of a mobility threshold and a cell center threshold for UE; and a transmission unit configured to transmit the at least one of the mobility threshold and the cell center threshold to the UE.

In some examples, the configuration unit is further configured to: configure a measurement relaxation condition for the UE, and transmit the measurement relaxation condition to the UE.

According to an eighth aspect of the disclosure, a communication apparatus is provided, and is performed by a network device. The apparatus includes: a transmission unit configured to transmit instruction information of measurement relaxation, where the instruction information is configured to instruct the UE to perform measurement relaxation.

In some examples, the instruction information includes the measurement window duration and a measurement window period.

In some examples, the measurement window period is K times as long as the measurement window duration, where $K \geq 2$.

According to a ninth aspect of the disclosure, user equipment is provided. The user equipment includes: a processor, a transceiver, a memory, and an executable program stored in the memory and runnable by the processor, where the processor executes steps of the communication method in the first aspect or the second aspect when running the executable program.

According to a tenth aspect of the disclosure, a network device is provided. The network device includes: a processor, a transceiver, a memory, and an executable program stored in the memory and runnable by the processor, where the processor executes steps of the communication method in the third aspect or the fourth aspect when running the executable program.

According to an eleventh aspect of the disclosure, a non-transitory computer-readable storage medium is provided and stores an executable program, where the executable program implements steps of the communication method in the first aspect, the second aspect, the third aspect or the fourth aspect when executed by a processor.

In the communication method and apparatus, the user equipment, the network device, and the storage medium according to the example of the disclosure, the measurement relaxation condition is set for the UE, the UE performs at least one of the BFD and the RLM, at least one of the measurement evaluation period and the instruction period of the reference signal is adjusted in response to determining that the UE satisfies the measurement relaxation condition, such that at least one of the measurement evaluation period and the instruction period is made longer, a measurement frequency of the reference signal is reduced, the UE enters a power-saving state and measurement relaxation on the RLM and the BFD is performed, and an effect of power saving is achieved.

What is claimed is:

1. A communication method, performed by user equipment (UE), and comprising:
   detecting whether a reference signal satisfies a measurement relaxation condition; and
   performing measurement relaxation on a measurement of the reference signal in response to determining that the reference signal satisfies the measurement relaxation condition;
   wherein detecting whether the reference signal satisfies the measurement relaxation condition comprises:
      detecting first parameters of the reference signal in a measurement evaluation time window, and computing an average of the first parameters in the measurement evaluation time window;
      computing a difference between a preset reference value and the average of the first parameters; and
      determining that the measurement relaxation condition is satisfied in response to determining that the difference is less than a preset mobility threshold; or, determining that the measurement relaxation condition is not satisfied in response to determining that the difference is greater than or equal to a mobility threshold; or
      determining that the measurement relaxation condition is satisfied in response to determining that the average of the first parameters is greater than a cell center threshold; or, determining that the measurement relaxation condition is not satisfied in response to determining that the average of the first parameters is less than or equal to a cell center threshold; or determining that the measurement relaxation condition is satisfied in response to determining that the difference is less than a preset mobility threshold, and the average of the first parameters is greater than a preset cell center threshold; or, determining that the measurement relaxation condition is not satisfied in response to determining that the difference is greater than or equal to a mobility threshold, or the average of the first parameters is less than or equal to a preset cell center threshold.

2. The method according to claim 1, wherein the measurement relaxation condition comprises one of the following:

the UE moves at a low speed;

the UE is located in a cell center; or the UE moves at a low speed and is located in a cell center.

3. The method according to claim 1, wherein measurement of the reference signal is a beam failure detection (BFD);

performing the measurement relaxation on the measurement of reference signals in all service cells in response to determining that the reference signals in all the service cells supporting carrier aggregation or dual connectivity satisfy the measurement relaxation condition; and not performing the measurement relaxation on the measurement of reference signals in all service cells in response to determining that a reference signal in at least one service cell supporting carrier aggregation or dual connectivity does not satisfy the measurement relaxation condition.

4. The method according to claim 1, further comprising:

performing no detection of the reference signal in response to determining that the reference signal satisfies the measurement relaxation condition, and the first parameter is greater than a set threshold.

5. The method according to claim 4, wherein the measurement of the reference signal is a beam failure detection (BFD);

performing the measurement relaxation on the measurement of reference signals in all service cells in response to determining that a reference signal in at least one service cell supporting carrier aggregation or dual connectivity satisfies the measurement relaxation condition; and not performing the measurement relaxation on the measurement of reference signals in all service cells in response to determining that the reference signals in all the service cells supporting carrier aggregation or dual connectivity do not satisfy the measurement relaxation condition.

6. The method according to claim 1, further comprising:

setting the preset reference value as the average of the first parameters in response to cell handover, or in response to determining that the average of the first parameters is greater than the preset reference value, or in response to determining that the measurement relaxation condition is not satisfied in a set time window.

7. The method according to claim 1, wherein performing the measurement relaxation on the measurement of the reference signal comprises:

adjusting at least one of a measurement evaluation period and an instruction period of the reference signal, and wherein the instruction period is longer than the measurement evaluation period in response to determining that the instruction period of the reference signal is adjusted.

8. The method according to claim 7, wherein adjusting the at least one of the measurement evaluation period and the instruction period of the reference signal comprises:

extending at least one of the measurement evaluation period and the instruction period;

wherein the reference signal comprises at least one of the following:

a radio link monitoring reference signal (RLM-RS) and a beam failure detection reference signal (BFD-RS).

9. User equipment, comprising a processor, a transceiver, a memory, and an executable program stored in the memory and executed by the processor, wherein the processor executes steps of the communication method according to claim 1 when running the executable program.

10. A non-transitory computer-readable storage medium, storing an executable program, wherein the executable program implements steps of the communication method according to claim 1 when executed by a processor.

11. A communication method, performed by user equipment (UE), and comprising:

receiving instruction information of measurement relaxation; and performing measurement relaxation in response to the instruction information;

wherein performing the measurement relaxation comprises:

detecting whether a reference signal satisfies a measurement relaxation condition;

performing measurement relaxation on a measurement of the reference signal in response to determining that the reference signal satisfies the measurement relaxation condition;

detecting first parameters of the reference signal in a measurement evaluation time window, and computing an average of the first parameters in the measurement evaluation time window;

computing a difference between a preset reference value and the average of the first parameters; and determining that the measurement relaxation condition is satisfied in response to determining that the difference is less than a preset mobility threshold;

or, determining that the measurement relaxation condition is not satisfied in response to determining that the difference is greater than or equal to a mobility threshold; or determining that the measurement relaxation condition is satisfied in response to determining that the average of the first parameters is greater than a cell center threshold; or, determining that the measurement relaxation condition is not satisfied in response to determining that the average of the first parameters is less than or equal to a cell center threshold; or determining that the measurement relaxation condition is satisfied in response to determining that the difference is less than a preset mobility threshold, and the average of the first parameters is greater than a preset cell center threshold; or, determining that the measurement relaxation condition is not satisfied in response to determining that the difference is greater than or equal to a mobility threshold, or the average of the first parameters is less than or equal to a preset cell center threshold.

12. The method according to claim 11, wherein the instruction information comprises a measurement window duration and a measurement window period.

13. The method according to claim 11, further comprising:

performing the measurement relaxation according to a measurement window duration within a measurement window period in response to determining that a discontinuous reception (DRX) is not configured; or performing the measurement relaxation according to the measurement window duration within the measurement window period during the DRX on duration in response to determining that the DRX is configured.

14. The method according to claim 11, wherein the measurement relaxation comprises at least one of the following:

a radio link monitoring (RLM) or a beam failure detection (BFD).

15. A communication method, performed by a network device, and comprising: configuring at least one of a mobility threshold and a cell center threshold for user equipment (UE), and transmitting at least one of the mobility threshold and the cell center threshold to the UE;

configuring a measurement relaxation condition for the UE, and transmitting the measurement relaxation condition to the UE;

wherein the measurement relaxation condition comprises one of the following:

in a case where the mobility threshold is configured for the UE but the cell center threshold is not configured for the UE, a difference between a preset reference value and an average of first parameters within a measurement evaluation time window being required to be less than the mobility threshold, wherein the first parameters are first parameters of a reference signal detected by the UE within the measurement evaluation time window;

in a case where the cell center threshold is configured for the UE but the mobility threshold is not configured for the UE, the average of the first parameters being required to be greater than the cell center threshold; or in a case where both the mobility threshold and the cell center threshold are configured for the UE, the difference being required to be less than the mobility threshold and the average of the first parameters being required to be greater than the cell center threshold.

16. A network device, comprising a processor, a transceiver, a memory, and an executable program stored in the memory and executed by the processor, wherein the processor executes steps of the communication method according to claim 15 when running the executable program.

\* \* \* \* \*